United States Patent [15] 3,653,833
Watson et al. [45] Apr. 4, 1972

[54] PROCESSING OF SULFUR DIOXIDE

[72] Inventors: William E. Watson, Mt. Tabor; Donald A. Aubrecht, Bernardsville, both of N.J.

[73] Assignee: Allied Chemical Corporation, New York, N.Y.

[22] Filed: Dec. 9, 1969

[21] Appl. No.: 883,531

[52] U.S. Cl. ...................................23/226, 23/1 B, 23/181
[51] Int. Cl. ........................................................C01b 17/04
[58] Field of Search.........................23/181, 226, 1; 263/19 B

[56] References Cited

UNITED STATES PATENTS

| 2,050,708 | 8/1936 | Lindblad.................................. | 23/226 |
| 2,431,236 | 11/1947 | Fleming et al. .......................... | 23/226 |
| 2,672,671 | 3/1954 | Robinson................................. | 263/19 |
| 3,199,955 | 8/1965 | West et al. ............................... | 23/226 |
| 3,495,941 | 2/1970 | Van Helden.............................. | 23/226 |

OTHER PUBLICATIONS

Perry, J. H.; Chemical Engineers' Handbook; McGraw Hill Book Co; 4th Edition, 1963; pages 9– 58 to 9– 60.

Primary Examiner—Oscar R. Vertiz
Assistant Examiner—G. O. Peters
Attorney—Albert L. Gazzola and Gerard P. Rooney

[57] ABSTRACT

Invention relates to a method for the reduction of sulfur dioxide with a reducing gas to elemental sulfur and/or other gaseous sulfur compounds in the presence of a catalyst and at a temperature within the range from 1,000° to 2,400° F., by passing a gaseous reaction mixture of a sulfur-dioxide containing gas with a reducing gas first through a contact chamber maintained at a temperature sufficient to raise the temperature of the mixture to 1,000° to 2,400° F., passing said heated gaseous reaction mixture through a reaction chamber containing a catalyst to produce a mixture comprising hydrogen sulfide, sulfur dioxide and sulfur, passing said product through a contact chamber containing contact means sufficient to absorb heat from said product stream to reduce the temperature of the product stream to about 700° to 800° F. and recovering the cooled product stream; said contact chambers being subjected to continuous alternating heat absorbing cycles while maintaining during the alternating cycles of the contact chambers the passage of the gaseous reaction mixture through the reaction chamber in the same direction through the catalyst bed.

14 Claims, 1 Drawing Figure

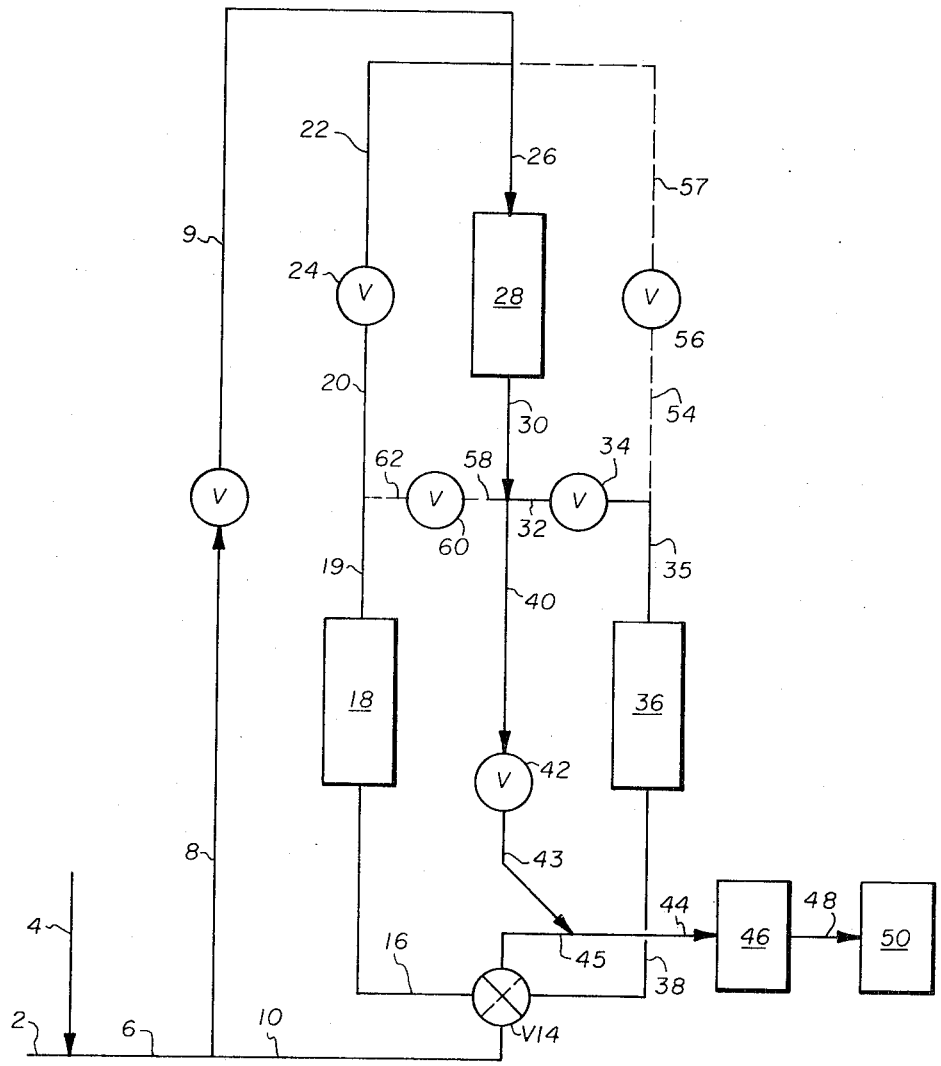

PROCESSING OF SULFUR DIOXIDE

Sulfur dioxide is found in a great many industrial gases emanating from plants involved in roasting, smelting and sintering sulfide ores, e.g., chalcopyrite ($CuFeS_2$), iron pyrites ($FeS_2$), or pyrrhotite ($FeS$), or gases from power plants burning high sulfur coal or other sulfurous ores or other industrial operations involving the combustion of sulfur bearing fuels, such as fuel oil, in refineries. As can be readily appreciated, the emission of sulfur dioxide in these gases presents not only a health hazard by contaminating the surrounding atmosphere, but results in a loss of valuable sulfur values. While it has previously been proposed to produce elemental sulfur from gases containing sulfur dioxide, there has not been a commercially feasible process for the reduction of sulfur dioxide to elemental sulfur.

The reduction of sulfur dioxide has been investigated extensively and there has been a myriad of references published on this subject. For instance, in U.S. Pat. Nos. 2,270,427; 2,388,259 and 2,431,236 the reduction of sulfur dioxide with natural gas, such as methane, is described wherein the sulfur values are recovered in an essentially three step reaction. In the first step the reduction of sulfur dioxide contained in the off gases from copper smelting operations is reacted with methane at temperatures of approximately 2,280° to 2,360° F. with a refractory material performing as a surface catalyst. The chief sulfur-containing by-products were carbonyl sulfide and hydrogen sulfide. The carbonyl sulfide is then reacted with additional sulfur dioxide at temperatures of about 800° to 840° F. over a bauxite catalyst to produce sulfur and the hydrogen sulfide is reacted with still further amounts of sulfur dioxide at a temperature of about 410° to 450° F. in the presence of bauxite to produce sulfur by the well known Claus reaction.

Likewise, in U.S. Pat. No. 3,199,955 a similar system is disclosed employing three catalytic converters to convert the sulfur dioxide to elemental sulfur, except that in the first, the reduction of sulfur dioxide with methane is achieved at temperatures of 1,470° to 1,830° F. in the presence of a catalyst including activated alumina, bauxite, calcium sulfide and quartz. With this process it is reported that between about 40 and 60 percent of the inlet sulfur dioxide appears in the production gases from the first step as elemental gaseous sulfur, the remainder is found as hydrogen sulfide, carbonyl sulfide, carbon disulfide and sulfur dioxide. The second and third steps of this process are essentially the same as those reported in the earlier patents. The carbonyl sulfide and carbon disulfide are reacted with sulfur dioxide to produce sulfur at a temperature of about 735° F. in the presence of a suitable catalyst, such as alumina; and in the final stage the hydrogen sulfide is reacted with sulfur dioxide at a temperature of about 390° to 530° F. in the presence of a catalyst, such as activated alumina, to produce additional sulfur. Elaborate steps are taken to assure that the temperature remains below 1,000° C. by the use of more than a single reactor since a single reactor will not permit holding the temperature below 1,000° C. The patentees provide a second reactor wherein the gases from the first pass into the second and temperatures below 1,000° C. are maintained. A major problem with the processes described in this patent is the necessary high equipment cost to be used to carry out the primary reaction step of converting to the above products as well as the intermediate reaction step of converting the carbonyl sulfide and/or carbon disulfide to additional sulfur.

Desirably, the reduction of sulfur dioxide with a reducing agent should be conducted in as few pieces of equipment as possible and produce as few by-products as possible which may be formed such as carbon dioxide, water, carbon monoxide, hydrogen sulfide, carbon disulfide, and sulfur. By-product formation depends upon a number of variables including temperature, flow rate of reactants, and ratio of reactants employed. Advantageously, equilibrium is sought because at equilibrium conditions it is possible to calculate the composition of the gas mixture that is obtained in the reduction of sulfur dioxide. For instance, under equilibrium conditions employing methane as the reducing gas the methane is completely reacted with the sulfur dioxide so that the process can be expressed by the equations:

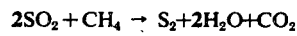

Furthermore, essentially no detectable amounts of carbonyl sulfide and/or carbon disulfide are formed in the reduction of sulfur dioxide under equilibrium conditions. Accordingly, when chemical equilibrium is achieved there is no need to provide additional equipment to convert these by-products to additional sulfur and there is no loss of unreacted methane. Ideally, the reduction of sulfur dioxide with a reducing gas is conducted under conditions which favor equilibrium. See, for instance, Zh. Khim. Prom, Yushkevich et al, No. 2 Pg. 33–37 (1934) wherein it is disclosed that equilibrium of the reduction of sulfur dioxide with methane is achieved at temperatures varying from approximately 700° to 1,000° C., space velocities from 70 to 1,000 and a superficial linear velocity of about 0.1 foot per second. They concluded that from the results of their experiments equilibrium is achieved in the reduction of $SO_2$ with methane at temperatures of 800° to 1,000° C., by maintaining the space velocity of the gas reactants (sulfur dioxide and reducing agent) through the catalyst bed in the order of up to about 500.

Also, in copending application of A. W. Michener et al, Serial No. 883,538, filed Dec. 9, 1969, a process is disclosed wherein equilibrium may be achieved at temperatures from 1,000° to 2,400° F. employing extremely short contact times and very high velocities of the gases through the catalyst bed.

As can be appreciated, very large equipment is necessary to process in an economical manner large volumes of sulfur dioxide-containing gas. Thus, in order to avoid the need for any one or more pieces of equipment results in substantial capital investment as well as potential processing problems which may occur.

The figure is a diagrammatic representation of the processing system of the present invention.

It has now been found that the present invention represents a significant improvement over the state of the art in that a reduction system for converting sulfur dioxide to elemental sulfur and/or other gaseous sulfur products in a practical and economical commercial plant design. In the processing system of the present invention the reaction gas mixture always passes through reaction chamber 28 in the same direction to provide a uniform temperature profile and stable operating conditions for the reduction of the sulfur dioxide gas. When operated in the manner to be described the temperature rise in the reaction chamber has been found to be within the range of about 100° to 300° F., so that the temperatures in the reactor are maintained between 1,000 and 2,400° F., preferably between 1,500 and 2,000° F., temperatures which do not seriously adversely affect the catalysts which are normally used in the reduction of sulfur dioxide in the presence of a reducing agent. In operating in this manner, there is no need for a second reaction zone to keep the temperature of the reaction gases within narrow limits to avoid premature degradation of the catalyst employed and to attain the desired reaction products.

Reaction chamber 28 contains a suitable catalytic material, preferably in the form of small balls or pebbles of approximately ¼ to ¾ inch in diameter. The reaction gas mixture may pass through the catalyst mass preferably at a rate sufficient to achieve chemical equilibrium. Contact times of from about ¼ to 7 seconds, preferably about 0.5 to 3.5 seconds, superficial linear gas velocities from about ⅓ to 30 feet per second, preferably 2 to 12 feet per second may advantageously be employed, depending upon the catalyst, reducing gas and the like. The reaction products exiting from the reactor are then contacted with a contact mass to cool these gases to a temperature in the order of about 700° to 800° F., a temperature at which hydrogen sulfide and sulfur dioxide may react to form additional sulfur. When the contact mass becomes too hot to cool the reaction product gases to the desired temperature, the cycle is reversed; that is, the contact mass previously used to heat the reaction gases is now used to cool the reaction products and the contact mass used to heat the reaction gases is now used to cool the reaction product gases. The reversal of cycles takes place about every 100 seconds to 3,000 seconds or more.

As noted, it has been found that this equilibrium may be achieved in the present process by reacting the sulfur dioxide-containing gas with a reducing gas at temperatures between about 1,000° to 2,400° F., preferably 1,500 to 2,000° F. over a catalytic material with contact times of about 0.25 to 7 seconds, preferably contact times within the range of 0.5 to 3.5 seconds, and superficial linear gas velocities of ⅓ to 30 feet per second. Under these reaction temperatures equilibrium conversion is achieved, thereby giving maximum utilization of the reducing agent in that only small amounts of unreacted carbon monoxide and hydrogen appear in the exit gases. Furthermore, the concentrations of carbonyl sulfide and carbon disulfide in the product gases are below detectable limits (gas chromatography), thereby permitting the use of a single reduction vessel preceding the conventional Claus reactor for converting the hydrogen sulfide to additional sulfur by reaction with sulfur dioxide.

The sulfur dioxide which is reduced in the present process may be essentially pure or it may comprise a small percent, as in an industrial waste gas, wherein the sulfur dioxide content may vary from less than about 1 percent to up to about 16 or more percent, the other components comprising essentially oxygen, nitrogen, carbon dioxide and water vapor.

As reducing agents at least one of carbon monoxide and hydrogen or any of the gaseous hydrocarbons may be employed. The preferred gaseous hydrocarbons for use in the present process are the normally gaseous hydrocarbons which contain about one to four carbon atoms and include natural gas, which is a mixture comprising methane, ethane, propane, the butanes, the pentanes, nitrogen and carbon dioxide; methane, ethane, propane and the butanes. The choice of the hydrocarbon is based on cost rather than technical considerations. Carbon monoxide and hydrogen may be employed individually or combined as by-product gases of other chemical reactions; for instance, producer gas, water gas, and synthesis gas, each of which contains hydrogen and carbon monoxide in various proportions. Other gases wherein either the carbon monoxide and/or hydrogen are the predominant components may be effectively utilized so long as they are capable of reducing the sulfur dioxide at an efficient rate.

Any of the well-known catalysts previously employed for the reduction of sulfur dioxide may be used, e.g., bauxite, alumina, silica, calcium sulfide, vanadium oxides and the like. However, a catalyst which has been found to be unexpectedly effective in the conversion of sulfur dioxide to elemental sulfur and/or other gaseous sulfur compounds in the presence of one of the aforementioned reducing agents is calcium aluminate.

The reduction of sulfur dioxide employing a gaseous hydrocarbon, especially natural gas and methane, as reducing agent, is carried out with a slight stoichiometric excess of reducing gas in order to achieve the proper overall gas balance in the downstream processing facilities. The ratio of reactants (sulfur dioxide:reducing gas) should be in the order of about 0.5 to 6.5:1 depending upon the reducing gas employed. For instance, if butane is used a ratio of sulfur dioxide to butane is about 6.5:1 to about 5.2:1; and with carbon monoxide and hydrogen the ratio is about 0.5:1 to about 1:1. As mentioned above, the preferred reducing agents are natural gas and methane and the ratio of sulfur dioxide to reducing gas in this instance is about 1.33 to 2.0:1, with an especially preferred ratio of sulfur dioxide:reducing gas of 1.7 to 1.9:1.

The residence times in which equilibrium may be achieved between the reaction of the sulfur dioxide-containing gas with the reducing gas in the catalyst bed is in the range of about 0.25 to 7 seconds, preferably 0.5 to 3.5 seconds, with superficial linear gas velocities of ⅓ to 30 feet per second, preferably 2 to 12 feet per second. At contact times of less than 0.25 second conversion is incomplete, whereas contact times in excess of 7 seconds provide no benefits since equilibrium is already reached. At superficial velocities of less than about one-third foot per second, the vessel diameters become too large to be practical and with superficial gas velocities in excess of 30 feet per second there results a sharp increase in pressure drop across the catalyst bed and heat sink masses, requiring exorbitant power costs.

The equipment which may be employed in the reduction of sulfur dioxide by the present process may be that conventionally employed for the contacting of gases with catalytic material. However, in the operation of the present invention for the reduction of sulfur dioxide with a reducing agent, the system as shown in the figure is to be employed so that the temperature profile of the reactor section, 28, is maintained within a controlled range ensuring equilibrium reaction conditions at the desired temperature, and thereby eliminate by-product formation, particularly carbonyl sulfide and carbon disulfide.

In the schematic diagram shown in the figure, the sulfur dioxide-containing gas, such as a roaster off-gas from the smelting of pyrrhotite ore containing approximately 13% sulfur dioxide, 86% nitrogen and 1% oxygen on a dry basis, typically at a temperature of about 500°–600° F. enters the system via line 2. An amount of reducing agent, such as methane, sufficient to effect the proper overall gas balance in the downstream processing facilities is introduced via line 4 and mixed with the $SO_2$-containing gas in line 6. A portion of the gas mixture in line 6 is by-passed directly to reactor 28 through line 8, and valve, 12, for reactor temperature control. The remaining portion of the gas mixture is passed through line 10 to a flow-reversing valve, 14. The gases which leave the flow-reversing valve, 14 pass through either line 16 or 38 to contact chambers 18 or 36, respectively, as will be explained below in more detail.

The contact chambers are packed with a suitable heat sink material such as refractory brick, pebbles, balls, pellets, or the like. This packing material which has been heated during a previous cycle cools off as the reaction gases pass through it. The heat which is released from the packing heats the reaction gases to a suitable temperature for entry into the reactor, 28, through lines 19, 20, 22 and 26. Valve 24 is open and valve 56 is closed during this cycle. Since the temperature in vessel 18 is constantly changing during this cycle the volume of gases by-passed via lines 8 and 9 is varied constantly in order to maintain substantially constant inlet temperature of the gases to the reactor. The by-pass flow may be as much as 25 percent of the total flow in line 6 at the start of a cycle reducing to 0 percent at the end of the cycle.

The gases leaving reactor 28 through line 30 pass through lines 32, 53 and 35 into contact chamber, 36. Valve 34 is open and valve 60 is closed during this cycle. A portion of the product stream is by-passed via line 40, valve 42, and line 43 to line 44. The gases which pass through chamber 36, which is similar in construction to chamber 18, lose their heat to the packing, thereby increasing its heat content for the reverse cycle. The gases leaving chamber 36 via line 38 again pass through valve 14 and line 45 and combine with the product stream from line 43 in line 44. The product stream by-pass is used to control the system's exit temperature and remove the exothermic heat of reaction from the system, thus keeping the system in thermal balance. The gases leaving the system pass through a sulfur condenser 46 to conventional Claus converters, 50, wherein the hydrogen sulfide formed in reactor 28 reacts with the residual sulfur dioxide in the product stream to produce additional elemental sulfur. The ratio of $H_2S$ to residual $SO_2$ in the gas leaving the system is 2:1.

Once the by-pass valve, 12, closes completely, or the temperature in line 38 becomes too high, for instance greater than 700°–800° F., the cycle is reversed and valves 24 and 34 are closed and valves 56 and 60 are opened. (As is readily apparent, the optimum [longest time] cycles are attained when the amount of high temperature gas withdrawn through line 40, valve 42 and line 43 is so calculated that when valve 12 closes completely, the temperature of the gases entering the reversing valve from line 38 reaches the allowable maximum temperature simultaneously.) The gases now flow through valve 14, line 38, into chamber 36 wherein they are heated by the packing material which was itself heated in the previous cycle by the product gases. On leaving chamber 36, the hot gases pass through lines 35, 54, 57 and 26 into the reactor, 28. On leaving the reactor, the product gases pass through lines 30, 58, 62 and 19 into chamber 18 where they give up their heat to the packing material. A portion of the hot product is by-passed via lines 40 and 43 to line 44. The cooled product gases pass from chamber 18 to valve 14 via 16, and the system operates as described above. The cycles are again reversed and the third cycle now becomes identical to the first and the fourth identical to the second, and so forth.

EXAMPLES 1 – 3

A series of runs are conducted in which a sulfur dioxide roaster gas containing 12% sulfur dioxide is reacted with methane according to the procedure of the present invention employing the apparatus of the figure. These examples are conducted on a single cycle wherein the reactants flow up through contact chamber 18 to reactor 28 and then pass to contact chamber 36 and from there to sulfur condenser 46. Reference is made to the various stream lines illustrated in the figure in the following tables (Tables I and II) which show the reaction conditions, gas compositions and the like. The concentrations of the components are expressed as mol percent. The catalyst employed is calcium aluminate supported on an alumina base. The conditions in the reactor include gas contact times of 0.6 second (Examples 1 and 2) and 0.9 second (Example 3) and superficial linear gas velocities of 7.2 feet per second (Examples 1 and 2) and 4.8 feet per second (Example 3). The feed gas contains an excess (0.4 mole percent) of methane for the quantitative consumption of the oxygen (0.8 mole percent) also present in feed. The molar ratio of sulfur dioxide to methane is 1.85:1. The reduction of sulfur dioxide is conducted under conditions of temperature, contact time and superficial linear gas velocities sufficient to effect equilibrium. The data in Table II were taken at one-half of the reaction cycle time.

It should be noted from the above data that the gases exiting from the reactor via Stream No. 30 contain no carbon disulfide and the concentration of carbonyl sulfide (0.035 mol percent) is below the detectable limit — its concentration being determined from equilibrium calculations. The concentration of carbonyl sulfide increases due to a shift in equilibrium as the gases are cooled. However, the concentration in this exit gas is not sufficient to require further additional equipment in order for its reaction with sulfur dioxide to produce additional sulfur.

EXAMPLE 4

Another run is conducted similar to the runs reported above, but instead of the reaction gases, sulfur dioxide and methane, passing through reactor 28 in only one direction as shown in the figure, the flow is reversed from cycle to cycle. In one cycle the gases enter reactor 28 via line 26 and exit from it via line 30; in the reverse cycle the gases enter reactor 28, via line 30 and exit from it via line 26. In Examples 1 to 3, above, the gas flow through reactor 28 is kept in the same direction during each cycle. The time between reversing cycles in Example 4 is 310 seconds. The conditions in the reactor include a gas contact time of 0.6 seconds and a superficial linear gas velocity of 7.2 feet per second. Reference is made to various stream lines illustrated in the figure in the following tables. Also presented for purposes of comparison is data obtained in Example 2, above, which is the preferred process of the present invention. The data in these tables were taken at one-half of the reaction cycle time.

TABLE I

| Example | Feed composition (mol percent) | | | | Cycle time, seconds | Contact time, seconds | Superficial velocity, feet per second | Temperature, ° F.[1] at Stream Number— | | | | | | |
|---|---|---|---|---|---|---|---|---|---|---|---|---|---|---|
| | $SO_2$ | $O_2$ | N | $CH_4$ | | | | 9 | 16 | 19 | 26 | 30 | 38 | 44 |
| 1 | 10 | 0.8 | 80 | 5.8 | 175 | 0.6 | 7.2 | 600 | 600 | 2,000 | 1,950 | 2,090 | 700 | 980 |
| 2 | 10 | 0.8 | 80 | 5.8 | 285 | 0.6 | 7.2 | 600 | 600 | 1,860 | 1,764 | 1,950 | 690 | 970 |
| 3 | 10 | 0.8 | 80 | 5.8 | 530 | 0.9 | 4.8 | 600 | 600 | 1,860 | 1,764 | 1,920 | 670 | 965 |

[1] Represents temperature conditions at 85 seconds for Example 1, 145 seconds for Example 2 and 235 seconds for Example 3.

TABLE II

| Stream composition | Example 1—Stream Number | | | | | | | Example 2—Stream Number | | | | | | | Example 3—Stream Number | | | | | | |
|---|---|---|---|---|---|---|---|---|---|---|---|---|---|---|---|---|---|---|---|---|---|
| | 9 | 16 | 19 | 26 | 30 | 38 | 44 | 9 | 16 | 19 | 26 | 30 | 38 | 44 | 9 | 16 | 19 | 26 | 30 | 38 | 44 |
| $SO_2$ | 10 | 10 | 6.3 | 6.3 | 1.8 | 1.4 | 1.5 | 10 | 10 | 8 | 8.3 | 1.65 | 1.4 | 1.5 | 10 | 10 | 7.1 | 7.1 | 1.65 | 1.4 | 1.5 |
| $CH_4$ | 5.8 | 5.8 | 2.8 | 2.9 | | | | 5.8 | 5.8 | 4.4 | 4.5 | | | | 5.8 | 5.8 | 3.6 | 3.7 | | | |
| $H_2O$ | 15 | 15. | 18 | 18 | 20 | 21 | 22 | 15 | 15 | 16 | 16 | 21 | 22 | 22 | 15 | 15 | 17 | 17 | 21 | 22 | 22 |
| $H_2S$ | | | 0.57 | 0.55 | 2.1 | 3.1 | 2.9 | | | 0.27 | 0.26 | 2.4 | 3.2 | 3.0 | | | 0.48 | 0.44 | 2.5 | 3.4 | 3.2 |
| CO | | | 0.7 | 0.68 | 1.0 | 0.08 | 0.27 | | | 0.21 | 0.2 | 0.78 | 0.05 | 0.22 | | | 0.26 | 0.24 | 0.72 | 0.01 | 0.18 |
| $CO_2$ | | | 1.9 | 1.8 | 4.5 | 5.4 | 5.2 | | | 1.0 | 0.95 | 4.8 | 5.4 | 5.3 | | | 1.5 | 1.4 | 5.0 | 5.5 | 5.4 |
| $S^1$ | | | 1.2 | 1.2 | 2.8 | [3]0.69 | [3]1.2 | | | 0.6 | 0.58 | 2.8 | [3]0.95 | [3]1.23 | | | 0.9 | 0.84 | 2.8 | [3]0.67 | [3]1.2 |
| $CS_2$ | | | 0.19 | 0.19 | | | | | | 0.11 | 0.10 | | | | | | 0.18 | 0.17 | | | |
| COS | | | 0.11 | 0.11 | [2]0.034 | 0.25 | 0.22 | | | 0.06 | 0.06 | [2]0.035 | 0.22 | 0.18 | | | 0.09 | 0.085 | [3]0.036 | 0.17 | 0.14 |
| $O_2$ | 0.8 | 0.8 | 0.23 | 0.25 | | | | 0.8 | 0.8 | 0.44 | 0.48 | | | | 0.8 | 0.8 | 0.31 | 0.32 | | | |
| $H_2$ | | | 1.7 | 1.7 | 2.2 | 1.1 | 1.3 | | | 0.5 | 0.46 | 1.7 | 1.0 | 1.2 | | | 0.68 | 0.61 | 1.65 | 0.82 | 1.0 |

[1] As $S_2$ vapors.  [2] Below detectable limits of analytical determination.  [3] Combined streams of $S_2$, $S_6$ and $S_8$ vapors.

TABLE III

| Example Number | Feed composition (mol percent) | | | | Cycle time, seconds | Temperature, ° F.[a] Stream Number— | | | | |
|---|---|---|---|---|---|---|---|---|---|---|
| | $SO_2$ | $O_2$ | N | $CH_4$ | | 19 | 26 | 30 | 38 | 44 |
| 4 | 10 | 0.8 | 80 | 5.8 | 310 | 1,860 | 1,764 | 1,940 | 730 | 1,040 |
| 2 | 10 | 0.8 | 80 | 5.8 | 285 | 1,860 | 1,764 | 1,950 | 680 | 970 |

[a] Represents temperature conditions at 155 seconds for Example 4 and 145 seconds for Example 2.

TABLE IV

| Stream Composition | Example 4 Stream No. 30 | Example 2 Stream No. 30 |
| --- | --- | --- |
| $SO_2$ | 2.0 | 1.7 |
| $CH_4$ | — | — |
| $H_2O$ | 0.02 | 0.02 |
| $H_2S$ | 1.8 | 2.4 |
| CO | 1.8 | 0.8 |
| $CO_2$ | 3.6 | 4.8 |
| S[1] | 2.8 | 2.8 |
| $CS_2$ | 0.02 | — |
| COS | 0.08 | 0.035 |
| $O_2$ | — | — |
| $H_2$ | 1.8 | 1.8 |

[1] As $S_2$ vapors

From these data it may be seen that the gas streams exiting from heat exchanger 38 and the mixed gas stream 44 going to the the Claus unit wherein reversible flow is employed are hotter (730° and 1,040°, respectively) than the gases (680° and 970°, respectively) exiting from the reaction unit employing unidirectional flow, the preferred processing embodiment of the present invention. Also, the product gas stream 30 from the reactor in which reversible gas flow is practiced contains 0.08 mol percent carbonyl sulfide; whereas the concentration of carbonyl sulfide in the product gas stream 30 using the preferred procedure of the present invention contains only 0.035 mol percent. Thus, while equilibrium may have been achieved in the reversible reactor of Example 4, it should be noted that an undesirably high concentration of carbonyl sulfide is obtained.

More significantly, however, is that this example demonstrates that by employing reversible gas flow in the reactor undesirably high temperatures are attained in the catalyst bed. The temperature profile of this reactor is shown in Table V, below. Also presented for purposes of comparison is the temperature profile of the reactor of Example 2.

TABLE V

| Layer No. in Reactor | Temperature (°F.) of Gas Example 2 | Example 4 |
| --- | --- | --- |
| 0 | 1764 | 1764 |
| 20 | 1840 | 2040 |
| 40 | 1880 | 2280 |
| 60 | 1915 | 2470 |
| 80 | 1940 | 2490 |
| 100 | 1960 | 2495 |
| 120 | 1970 | 2490 |
| 140 | 1975 | 2450 |
| 160 | 1975 | 2280 |
| 180 | 1975 | 2060 |
| 192 | 1975 | 1940 |

During the cycle in which the above data were obtained, the temperature of the reactor gas exiting from the reactor of Example 4 varied from 1,810° to 2,100° F., a temperature variation of almost 300° F. However, in the reactor system of Example 2, the variation during the cycle of the reactor exit gas was only between 1,960° to 1,990° F. Furthermore, as can be seen from the data of Table V, the temperature profile in the reversible reactor system temperatures approaching 2,500° F. (catalyst layers 60 to 140) are attained; whereas in the reactor system of Example 2, the maximum temperature attained is 1,975°, more than 500° F. below the reversible bed reactor system. At the higher temperatures there is a significant reduction in the life and performance of the catalyst employed as well as poorer product distribution as equilibrium reaction conditions.

We claim:
1. A continuous method for the reduction of sulfur dioxide with a reducing agent which comprises the steps of heating a gaseous reaction mixture comprising a sulfur dioxide-containing gas and a gaseous reducing agent to a temperature of from 1,000° to 2,400° F. by-passing said gaseous reaction mixture through a first contact chamber wherein said gaseous mixture is heated by a contact mass in said chamber maintained at a temperature sufficient to raise the temperature of said gaseous mixture to about 1,000° to 2,400° F., passing said heated gaseous reaction mixture through a reaction chamber containing catalytic material to produce a product stream comprising hydrogen sulfide, sulfur dioxide, and sulfur, passing said product stream through a second contact chamber containing contact means sufficient to absorb heat from said product stream to reduce the temperature of the product stream to about 700° F. to 800° F., and recovering said cooled product stream; said contact chambers being subjected to continuous alternating heat absorbing cycles while maintaining during the alternating cycles of the contact chambers the passage of the gaseous reaction mixture through the reaction chamber in the same direction through the catalyst bed.

2. The process of claim 1 wherein said gaseous reaction mixture increases in temperature up to about 300° F. as it passes through the reaction chamber during conversion of the mixture to an equilibrium product stream.

3. The process of claim 1 wherein the cycles alternate about every 100 to 3,000 seconds.

4. The process of claim 1 wherein the conditions in the reaction chamber are sufficient to effect chemical equilibrium and to produce an equilibrium product stream consisting essentially of hydrogen sulfide, sulfur dioxide and sulfur.

5. The process of claim 1 wherein the reducing catalyst is calcium aluminate.

6. The process of claim 1 wherein the gaseous reducing agent is selected from the group consisting of hydrogen, carbon monoxide, a mixture of hydrogen and carbon monoxide, and a gaseous hydrocarbon.

7. The process of claim 6 wherein the reducing agent is carbon monoxide.

8. The process of claim 6 wherein the reducing agent is a gaseous hydrocarbon selected from the group consisting of natural gas and a low molecular weight hydrocarbon of one to four carbon atoms.

9. The process of claim 8 wherein the gaseous hydrocarbon is natural gas.

10. The process of claim 8 wherein the gaseous hydrocarbon is methane.

11. The process of claim 10 wherein the ratio of sulfur dioxide to methane is in the range of 1.33 to 2.0 to 1.

12. The process of claim 4 wherein the gaseous reaction mixture is passed through the catalyst in the reaction chamber at a superficial linear gas velocity of from ⅛ to 30 feet per second and a contact time of about ¼ to 7 seconds.

13. The process of claim 1 wherein the temperature in the reaction chamber is maintained within the range of about 1,500° to 2,400° F.

14. A continuous method for the preparation of the equilibrium products of the reduction of sulfur dioxide with a gaseous reducing agent which comprises the steps of heating a gaseous reaction mixture comprising a sulfur dioxide-containing gas and a gaseous reducing agent selected from the group consisting of hydrogen, carbon monoxide, a mixture of hydrogen and carbon monoxide, and a gaseous hydrocarbon to a temperature of from 1,000° to 2,400° F. by passing said gaseous reaction mixture through a first contact chamber wherein said gaseous mixture is heated by a contact mass in said chamber maintained at a temperature sufficient to raise the temperature of said gaseous mixture to about 1,000° to 2,400° F., passing said heated gaseous reaction mixture through a reaction chamber containing a catalytic material at a superficial linear gas velocity through the catalyst of from ⅓ to 30 feet per second and a contact time of about ¼ to 7 seconds to produce an equilibrium product stream consisting essentially of hydrogen sulfide, sulfur dioxide and sulfur, passing said equilibrium product stream through a second contact chamber containing contact means sufficient to absorb heat from said product stream to reduce the temperature of the product stream to about 700° to 800° F., and recovering said cooled equilibrium product stream; said contact chambers being subjected to continuous alternating heat absorbing cycles while maintaining during the alternating cycles of the contact chambers the passage of the gaseous reaction mixture through the reaction chamber in the same direction through the catalyst bed.

* * * * *